United States Patent [19]
Laurent et al.

[11] Patent Number: 6,113,119
[45] Date of Patent: Sep. 5, 2000

[54] ASSEMBLY COMPRISING A WHEEL AND A SUSPENSION INTEGRATED INTO THE WHEEL

[75] Inventors: Daniel Laurent; Marc Sebe, both of Marly; Daniel Walser, Granges-Paccot, all of Switzerland

[73] Assignee: Conception Et Developpement Michelin S.A., Givisiez, Switzerland

[21] Appl. No.: 09/078,050

[22] Filed: May 13, 1998

[30]     Foreign Application Priority Data

May 16, 1997 [FR] France ........................ 7-06226

[51] Int. Cl.[7] ................. B60G 25/00; B60K 1/00
[52] U.S. Cl. .................... 280/124.1; 180/65.5; 267/68
[58] Field of Search ............... 280/79.4, 86.751, 280/93.502, 93.512, 124.1; 180/65.5, 65.2, 65.6; 267/68

[56]         References Cited

U.S. PATENT DOCUMENTS

| | | | |
|---|---|---|---|
| 1,041,097 | 10/1912 | Kennedy | 280/124.126 |
| 1,093,131 | 4/1914 | Hays | 280/124.127 |
| 1,819,579 | 8/1931 | Whitcomb | 280/124.127 |
| 1,984,694 | 12/1934 | Nottoli . | |
| 2,105,171 | 1/1938 | Tjaarda . | |
| 2,155,521 | 4/1939 | Zavarella . | |
| 2,175,516 | 10/1939 | Bugatti . | |
| 2,238,410 | 4/1941 | Capuciati . | |
| 2,939,344 | 6/1960 | Harris . | |
| 3,497,233 | 2/1970 | Bolaski, Jr. | 280/86.757 |
| 3,567,243 | 3/1971 | Ruhlin | 280/124.127 |
| 3,578,354 | 5/1971 | Schott . | |
| 3,666,178 | 5/1972 | Crimmins et al. . | |
| 4,487,429 | 12/1984 | Ruggles | 280/5.521 |
| 4,546,997 | 10/1985 | Smyers | 280/5.521 |
| 5,087,229 | 2/1992 | Hewko et al. | 475/149 |
| 5,284,353 | 2/1994 | Shinji et al. | 280/660 |
| 5,366,037 | 11/1994 | Richey | 180/65.5 |

FOREIGN PATENT DOCUMENTS

| | | |
|---|---|---|
| 0492290 | 7/1992 | European Pat. Off. . |
| 0541940 | 5/1993 | European Pat. Off. . |
| 373512 | 5/1907 | France . |
| 15215 | 5/1912 | France . |
| 2726231 | 5/1996 | France . |
| 1015702 | 9/1957 | Germany . |
| 9402564 | 5/1994 | Germany . |

*Primary Examiner*—J. J. Swann
*Assistant Examiner*—Christopher Bottorff
*Attorney, Agent, or Firm*—Baker Botts, L.L.P.

[57]            ABSTRACT

A wheel connecting assembly for an automobile which includes a wheel carrier and a support having a guide member for guiding the wheel carrier in translational movement relative to the support. The support has journals for mounting the support on the chassis of a vehicle. The wheel carrier is mounted on the guide member by means of a bar sliding in the guide member. The assembly includes a spring and an electromechanical device capable of being operated in order to control the deflecting movements of the suspension.

43 Claims, 8 Drawing Sheets

ASSEMBLY COMPRISING A WHEEL AND A SUSPENSION INTEGRATED INTO THE WHEEL

BACKGROUND OF THE INVENTION

The present invention relates to the suspension of vehicles. It relates both to the guidance of a vehicle wheel relative to the chassis of this vehicle and to the control of the deflection of the wheel relative to the chassis.

It is known that a wheel is mounted on a hub, and that the hub is mounted on a wheel carrier by means of a rolling bearing embodying the axis of rotation of the wheel. The guidance of the wheel involves allowing the wheel carrier to be displaced relative to the vehicle by an amount sufficient for the suspension of the vehicle. At the same time, the guidance of the wheel must be such that the path of the vehicle is controlled as strictly as possible. The deflecting movement which is sought is to a great extent in the vertical direction. It may be desirable to allow slight movement in the longitudinal direction, while, ideally, the aim is to avoid any relative movement in the transverse direction. Furthermore, the steering and the variations in camber which all these movements may induce must be strictly contained, thus also resulting in a design constraint which the average person skilled in the art must take into account.

If the "plane" of the wheel refers to the plane perpendicular to the axis of rotation of the wheel and passing through the middle of the wheel or, more specifically, through the center of the area of contact with the ground of a tire or of an elastic casing mounted on said wheel, the control of the deflecting movements is tantamount to stating that guidance must ensure a strictly controlled position of the plane of the wheel relative to the chassis.

In addition to the aspect of the guidance of the plane of the wheel, the suspension must also ensure that the vehicle load is transferred to the wheel and that the amplitude. of the movements allowed by the guidance is controlled. This is conventionally the function of the springs and shock absorbers or of the members combining the spring function (flexibility) and the damping function (preventing oscillations from being maintained).

All the suspensions used at the present time on vehicles have in common the characteristic of being somewhat bulky. The suspension arms must be of some length, so that their angular movement is not accompanied, for example, by excessive track variations (suspension diagrams). Even the MacPherson strut, of which the increasing use is known to be due to the greater space which it leaves for installing an engine unit in the transverse position, has its share of disadvantages, including its large overall height.

Moreover, the search for an even better compromise between suspension comfort and roadholding leads to the provision of so-called active or semi-active suspensions, the operation of which is now made possible by advances in electronics. In general, the result of this is that the installation of the suspension on the vehicle takes up even more space by increasing the bulk of the springs and/or shock absorbers, or even by adding additional members forming a spring or shock absorber.

SUMMARY OF THE INVENTION

The object of the invention is to provide a complete wheel connecting system which is easy to integrate into a vehicle, while at the same time making it possible to have a suspension of which the characteristics of elasticity and damping are effectively controlled.

The invention provides a wheel connecting assembly for an automobile. Said assembly comprises a hub designed to support a wheel, said wheel comprising essentially a disk and a rim, said rim having a reference width and a reference diameter, said assembly comprising a wheel carrier defining the axis of rotation of the hub, a support comprising a guide member for guiding the wheel carrier in translational movement relative to the support, the support comprising mounting means for making it possible to mount the support on the chassis of a vehicle, the wheel carrier being mounted on the guide member by means of a single elongate bar sliding relative to and guided by the guide member so as to be fixed in terms of rotation about the sliding axis, the wheel carrier being mounted on the bar at the two ends of the latter, said assembly comprising means for supporting the vehicle load transmitted by the support to the wheel carrier, wherein the wheel carrier, the bar and the guide member are accommodated in a limiting envelope delimited radially by the reference diameter and axially, on one side, by a limit set by the disk of said wheel and, on the other side, by a virtual plane tangent to the rim.

In the present specification, by the term "reference" is meant an overall dimension serving as a reference point for the design of the assembly, although the wheel per se, being removable, may be considered as not forming part of said assembly. In practice, said assembly will be designed for receiving one or some wheels of specific dimensions. The reference in question gives an overall size limit for the members of the assembly, whatever the actual embodiment of the wheel and of the associated tire or elastic casing.

The invention provides an assembly making it possible to integrate the guidance necessary for the deflection of the wheel and the elements making it possible to ensure the required flexibility and the control of deflection within the wheel. Thus, the essential functions of the suspension (guidance of the wheel plane, degree of freedom of deflection in the desired direction and control of the deflecting movements) are integrated into the actual interior of the volume within the wheel. It is thus possible to fasten this assembly to the vehicle chassis very simply in any suitable way, in particular rigidly. In the latter case, the invention allows very simple implementation, since the connection of the assembly to the vehicle chassis has no function other than that of ensuring the transmission of forces.

Preferably, in order to reduce its overall size radically, the invention aims to install as many members useful for suspension as possible in the volume available within the wheel, that is to say on one side of the wheel disk and radially within the rim.

The electronic control means available at the present time make it possible to operate an electric motor more quickly and more directly than a hydraulic or pneumatic member. Consequently, in a particularly advantageous variant, the invention provides for using a linear or rotary electric motor for controlling the deflecting movements of the wheel. An arrangement is thus provided which makes it possible to accommodate such a motor in the assembly according to the invention, while at the same time remaining appreciably within the limits of the internal space of the wheel. The invention thus has the advantage of being particularly suitable for the active control of the suspension characteristics and, more specifically, for the direct electric control of the suspension characteristics.

It may be noted that, if the translational guidance of the bar is "frictionless", that is to say involves as little friction as possible, the control of the deflecting movement is thereby made easier, since it is not falsified by extraneous friction, the extent of which is often variable. Rolling guidance is highly appropriate. Rollers cooperating with raceways arranged on the bar may be used, the rollers being mounted rotatably on and relative to the guide member. It would also be conceivable to have contact surfaces sliding relative to one another, inasmuch as they comprise a suitable treatment or inasmuch as they are sufficiently lubricated. For example, a fluid bearing may be used. This variant is particularly suitable for controlling the deflection essentially by means of an electromechanical machine which can be operated for this purpose, since the absence of dry friction simplifies its operation and improves overall performances.

The invention applies both to leading wheels and driving wheels and to wheels which are leading and driving at the same time. It makes it possible to install a pivot and fix the control point for the steering. It makes it possible, in the case of leading wheels, to arrange the pivot axis of the wheel in the above-defined wheel plane, that is to say to be able to adopt the so-called "pivot in axis" solution. It makes it possible to install a member for transmitting a torque to the wheel (torque pickup). This member is engaged by a conventional transmission shaft or it is engaged directly by a traction motor, for example an electric motor, which, in this case, may itself form part of the assembly provided by the invention. In the latter case, the torque which has to be generated results in a motor volume such that it could possibly project more appreciably beyond the volume within the wheel. However, even in this case, the motor stator can come to bear in said assembly, so that the reaction torque is within said assembly. This also contributes to the great compactness of the assembly, bearing in mind all the functions which are performed, and makes the assembly easier to install in and adapt to the vehicle.

DESCRIPTION OF THE DRAWINGS

The invention will be understood better from the following description of nonlimiting examples, with reference to the accompanying drawing in which.

DESCRIPTION OF PREFERRED EMBODIMENTS

The various figures show a tire 1 mounted on a rim 10, the latter being produced in two axially separable parts 11 and 12, according to one of the possible techniques making it possible to mount a tire 1 on a rim. Other solutions could, of course, be adopted, such as a tire fastened permanently to its rim or else a noninflated or nonpneumatic tire.

The rim 10 is connected to a wheel disk 13. The rim 10 and the disk 13 form a wheel 14. This wheel 14 is mounted on a hub 15 by means of bolts 16. A brake disk 17 is integral with the hub 15. The details for carrying out the mounting of a wheel and a brake disk on a hub are well known to the average person skilled in the art and do not require a more comprehensive explanation. It is merely pointed out that there may be a fastening of somewhat small dimensions between the brake disk 17 and the hub 15, and that the operating forces are absorbed by the fastening attributable to the bolts 16. A gearwheel 18, the function of which will emerge later, is likewise integral with the hub 15. The hub 15 and the gearwheel 18 are made integral with one another by means of a set of pins 19, so as not only to retain the parts on one another, but also to ensure that a torque is transmitted between the gearwheel 18 and the hub 15. The subassembly which has just been described forms the rotating parts of the assembly according to the invention. Their axis of rotation is the axis XX'.

These rotating parts are mounted on a wheel carrier 3 by means of a rolling bearing 2. The wheel carrier 3 forms a flange inserted into the free space located axially between the hub 15 and the gearwheel 18. The outer ring 22 of the rolling bearing 2 is integral with the wheel carrier 3 by virtue of pins 23.

Figure 3:
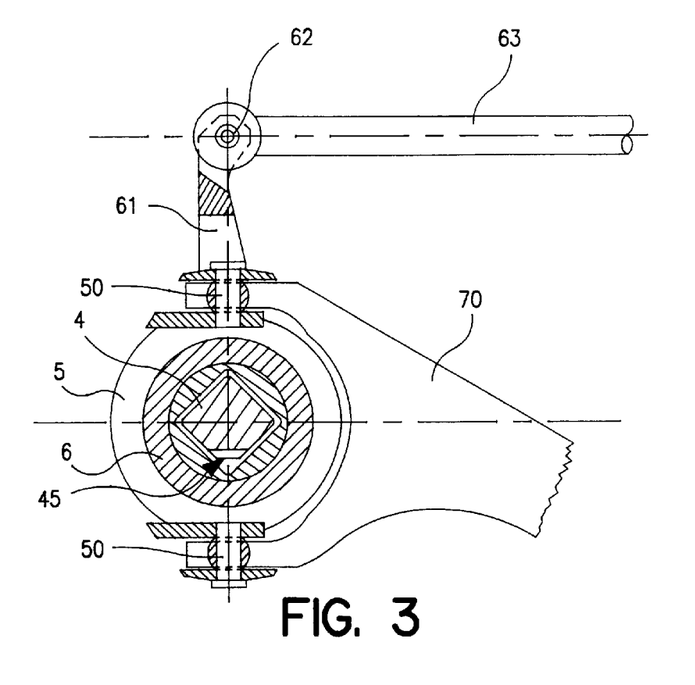
FIG. 3 is a section along III—III of FIG. 2, illustrating the first embodiment of the invention.
Figure 4:
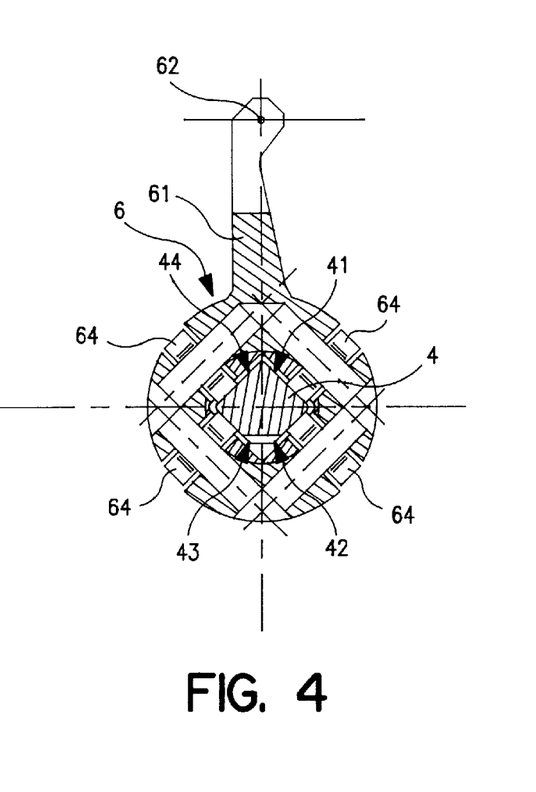
FIG. 4 is a section along IV—IV of FIG. 2, illustrating the first embodiment of the invention.

The wheel carrier 3 is itself made integral with a bar 4. The wheel carrier 3 comprises two tabs 31, 32 fastened to the two ends of said bar 4. The bar 4 illustrating the invention has a longitudinal axis CC'. Moreover, a rectangular cross section is selected for it (in fact, the cross section is square—see FIGS. 3 and 4). This type of cross section, among other possible ones (such as any polygonal cross section), will make it possible to block the rotation of the bar 4 about its axis CC'. The bar 4 thus comprises four raceways 41, 42, 43, 44 (FIG. 4). The wheel carrier 3 and the bar 4 are arranged and mounted relative to one another, in such a way that the axis CC' of the bar 4 is perpendicular and secant to the axis XX' of rotation of the wheel 14, the advantage of arranging the bar centrally being, in particular, that it potentially makes the stroke of the suspension as great as possible. The bar 4 and the wheel carrier 3 form part of what is normally referred to as the nonsuspended members and are nonrotating.

The bar 4 bears on a set of eight rollers 64 cooperating two by two with the raceways 41, 42, 43, 44 (see FIG. 4). These rollers are mounted rotatably on a guide member 6, in order to allow the translational movement of the bar 4 along its axis CC'. It may be noted that the guide member 6 surrounds the bar 4, and that the wheel carrier is mounted on the bar at the two ends of the latter. The bar is accommodated in an envelope delimited radially by the reference diameter $\phi_R$ and axially, from a limit set by the disk of said wheel, by a width corresponding substantially to the reference width $L_R$.

The bar 4 and the guide member 6 form a slideway. It may be noted that the bar 4 cannot rotate about the axis CC' independently of the guide member 6. The guide member 6 is itself mounted rotatably about the axis CC' of the bar 4 and in a support 5 by means of rolling bearings 56. The guide member 6 and the support 5 thus form a pivot, the function of which is to allow a degree of freedom of the rotation of the wheel carrier 3 to the support 5. The bar is therefore mounted in a pivot. It may also be noted that the central arrangement of the bar also makes it easier to produce a pivot; if the longitudinal axis of the bar were offset relative to the center of the wheel, installing the pivot nevertheless ought preferably to ensure that the axis, about which the wheel steers, remains centered in the wheel, so that it would not be materially possible to install the pivot directly about the guide member of the bar.

There is therefore one and only one degree of freedom between the guide member 6 and the wheel carrier 3: a relative translational movement along the same axis CC'. This translational movement is sufficient both upwards and downwards. It thus makes it possible to have a suspension stroke which is sufficient in terms of both expansion and compression. As an illustration, it may be noted that the stroke can reach a value of the order of half the inside diameter $\phi_R$ of the rim 10. Stops 33, 34 produced from an elastic material, such as, for example, rubber, prevent the violent impact of the tabs 31 and 32 directly on the edges 60 of the guide member 6 when the deflection of the suspension reaches the end of the stroke.

Moreover, there is one and only one degree of freedom between the support 5 and the guide member 6: a relative rotation, and this relative rotation takes place about the axis CC'. The amplitude of this rotation is sufficient to ensure the steering of the wheel 14. It is limited geometrically by the meeting of the wheel 14 or of the wheel carrier 3 with the support or mechanical means of mounting the support on the vehicle body, or, more exactly, it is limited by stops (not shown) for preventing any undesirable contact of the wheel with nonrotating parts. It may also be noted that a lever arm 61 (FIG. 3) is integral with the guide member 6. The lever 61 terminates at a point of engagement 62 to be connected to a steering control link 63. Where a nonleading wheel is concerned, the degree of freedom of rotation about the axis CC' may be blocked by means of a suitable mounting of a coupling bar at the point 62. However, it is, of course, also possible to produce a guide member in one piece with the support, so that, as a consequence of mechanical construction, there is only a single degree of freedom between the support and the wheel carrier, namely translational movement along the axis CC', affording the suspension movement.

It has been seen that the suspension movement provided by the present invention is ensured by the possible relative translational movement between the bar 4 and the guide member 6. It has also been seen that the steering of the wheel 14 is made possible by the relative rotation between the support 5 and the guide member 6 and is controlled by acting on the lever 61. The support may be mounted on the chassis of a vehicle rigidly by means of at least one mounting point arranged on the support for this purpose. This is the least elaborate use of the wheel connecting system provided by the invention.

However, the assembly illustrating the invention furthermore allows not only arradjustment of the camber of the wheel, but also actual permanent control of this camber. In this case, a plurality of support mounting points are used in order to define, on the support, an axis AA' and a control point B distant from said axis, the axis and the control point being capable of receiving means of connection to the chassis which are arranged so as to be capable of acting on the camber of the wheel.

Figure 2:
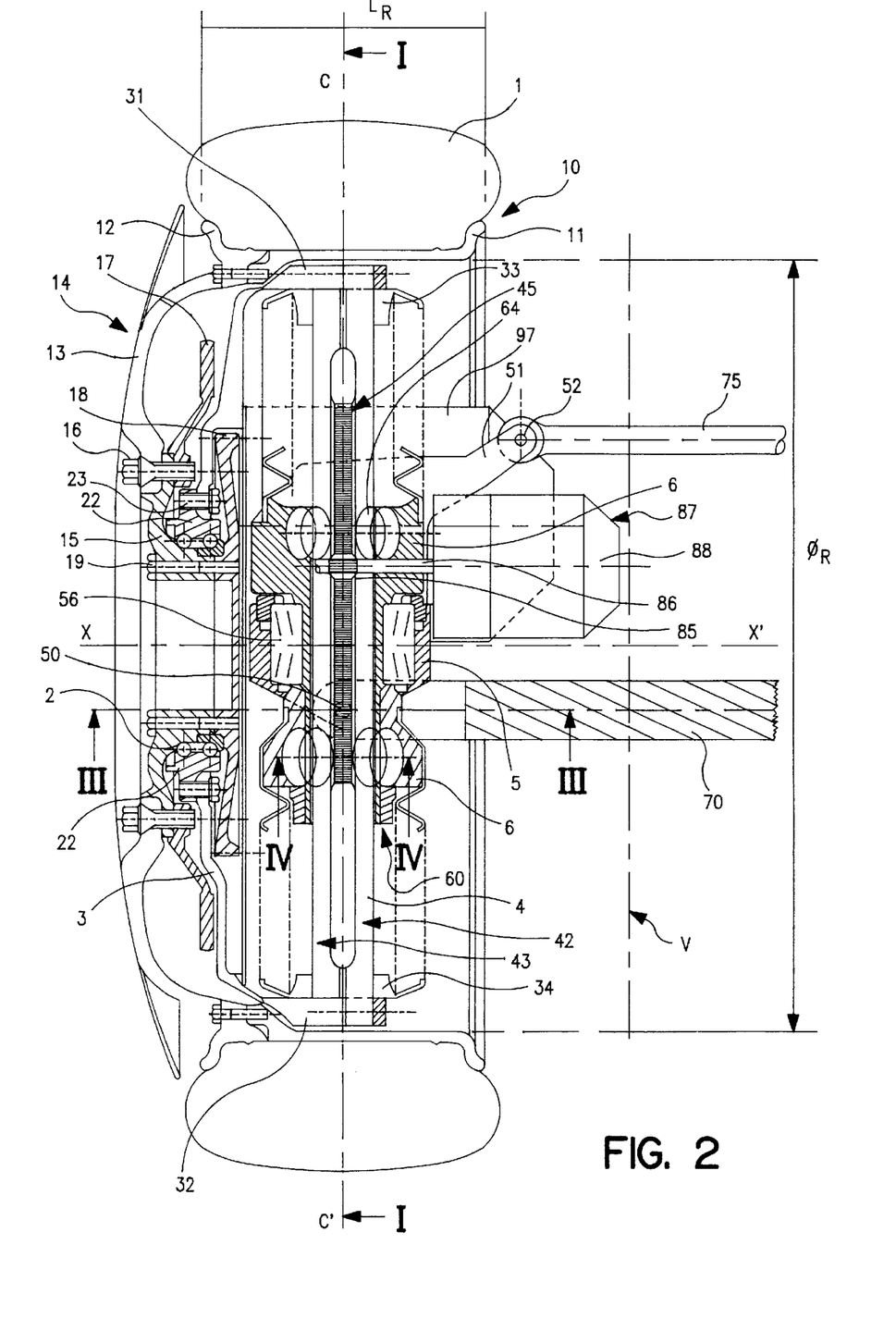
FIG. 2 is a partial view, in partial section along II—II of FIG. 1, illustrating the first embodiment of the invention.

The support 5 has the form of a cylindrical box (FIG. 2). Two aligned journals 50 are arranged at one end of the support, the lower end in this embodiment. These journals 50 define the axis AA'. At the other end (upper in this embodiment) of the support 5, there is an extension 51 (FIG. 2) carrying a journal 52 defining a control point. The journals 50 and the control point form three support mounting points. The support 5 is fastened to the vehicle body by means of an arm 70 and a rod 75. The arm 70 is mounted on the vehicle body so as to be capable of transmitting the weight of the latter and transferring said weight to the support 5. The arm is, for example, embedded in the vehicle body. In this case, there remains a degree of freedom of tilting of the support about the axis AA'. This degree of freedom may be blocked by connecting the rod 75 to the body in a suitable way. However, the rod 75 may also be used to impose a selected relative position of the control point journal 52) relative to the journals 50, that is to say relative to the axis AA'. In this case, the value of the camber of the wheel 14 can be changed. Said rod 75 has, if appropriate, an adjustable length. Or else, for continuous control while the vehicle is being used, said rod 75 is stressed by a suitable mechanism. The invention allows a very broad extent of variation in the camber; this is limited only by the meeting of members of the assembly according to the invention with one or other of the rods for connection to the body, or else the meeting of said members with the body itself.

It has just been described how the wheel connecting system provided by the present invention allows the wheel 14 to move in the vertical direction or, more specifically, along the axis CC', the exact orientation of the latter depending on the mounting of the support 5 on the vehicle body. It has also been described how the wheel connecting system provided makes it possible to control the steering and the camber of the wheel 14. A wheel rotating about the axis XX', the axis XX' being vertically moveable, is thus provided. The rest of the text will describe how the means for controlling the rotational and deflecting movements of the wheel can be integrated into the wheel connecting assembly provided by the invention.

The suspension movement (deflection of the wheel) may be taken as a starting point. In the example illustrating the invention, the means for controlling the deflection of the bar relative to the support are in the form indicated below. A spring 80 is installed between a first collar 81, connected to the wheel carrier 3 so as to be moveable vertically together with the wheel, and a second collar 82 integral with the guide member 6 and therefore vertically immoveable relative to the vehicle body. The spring 80 is mounted between two bearing points (embodied by the collars 80 and 81) offset relative to the axis CC' of the bar 4, thus making it easier to accommodate said spring in the volume available within the wheel 14, on one side of said bar 4. It may be noted, furthermore, that, by virtue of this offset installation of the spring 80 relative to the axis of the bar, the residual minimal bulk of the spring when it is compressed does not detract in any way from the suspension stroke, such as occurs as a result of the guidance of the bar 4. Moreover, there is a sufficient volume to install a spring capable of supporting a load corresponding to those encountered on vehicles, for example passenger cars. Thus, the spring is accommodated in a limiting envelope delimited radially by the reference diameter $\phi_R$ and axially, on one side, by a limit set by the disk of said wheel and, on the other side, by a virtual plane tangent to the rim.

The bar 4 comprises a rack 45 at the intersection between the raceways 42 and 43. A pinion 85 is in engagement on said rack. The pinion 85 transmits its rotational movement to the rotor 86 of an electromechanical machine 87, the stator 88 of which is integral with the guide member 6. The linear movement of the bar 4 is thus converted into a rotational movement, on which action is taken by means of the electromechanical machine 87 in order to perform the necessary damping function or any other more elaborate function aimed at imparting an active character to the suspension by means of an appropriate control of said electromechanical machine 87. The design of such an elaborate function does not per se form part of the present invention, the object of which is to provide the mechanical and electromechanical means making this possible. It may simply be added, for the sake of completeness, that a simple way of ensuring damping is to connect the electromechanical machine to a resistance load and to brake the rotational movement of its rotor according to the same principle as the well-known electric retarders equipping some road vehicles, such as passenger transport coaches. The invention thus makes it possible to produce an assembly, in which the means for controlling the deflection are accommodated in an overall envelope V delimited radially by the reference diameter $\phi_R$ and axially, from a limit set by the disk of said wheel, by a width less than double the reference width $L_R$, thus making it possible to ensure that the assembly is highly compact.

Figure 1:
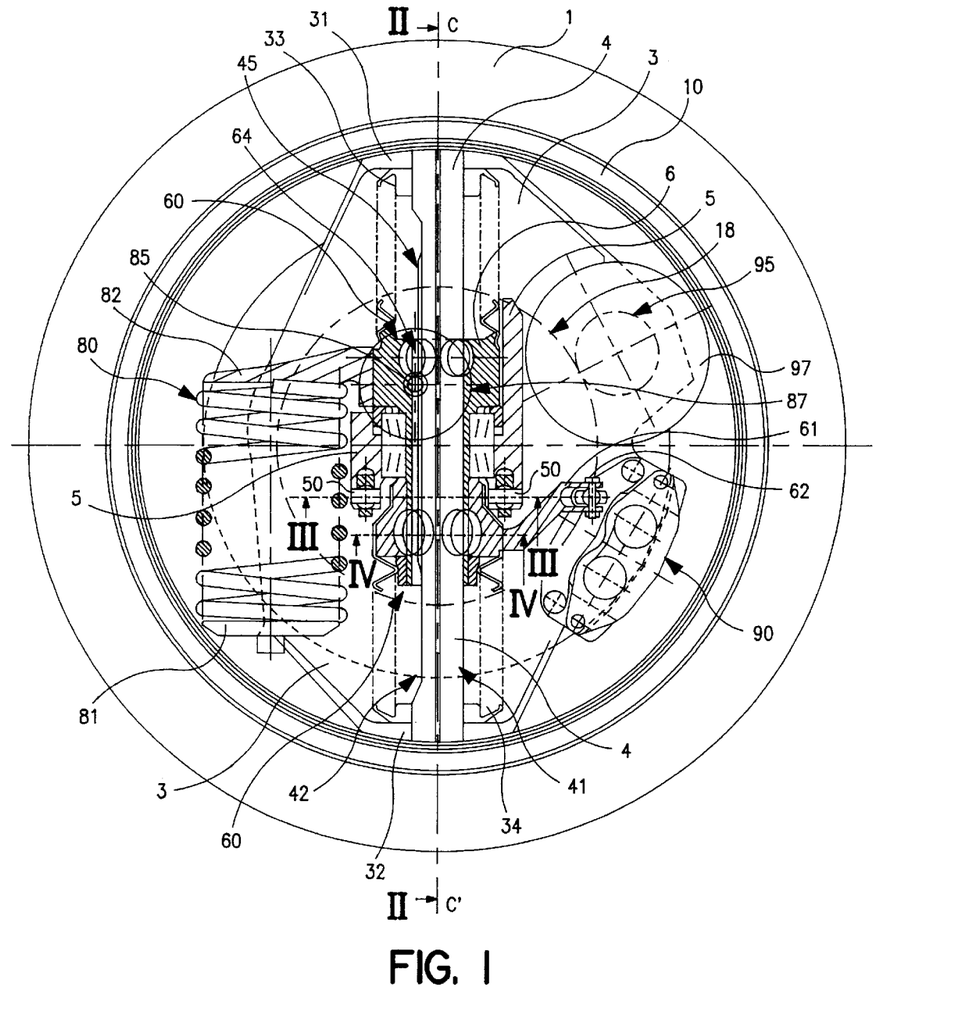
FIG. 1 is a partial view, in partial section along the line I—I of FIG. 2, illustrating a first embodiment of the invention.

Having explained the spring and damping functions or the equivalent functions, we turn to the installation of the braking means. It may be recalled that a brake disk 17 is integral with the hub 15. The braking force is applied to the brake disk 17 by a brake calliper 90 integral with the wheel carrier 3. The brake calliper 90 (which is not shown in FIG. 1 so as not to overload it) is offset relative to the axis CC' of the bar 4, thus making it possible to accommodate said calliper in the volume available within the wheel 14, on that side of said bar 4 which is not occupied by the spring 80. The bar 4 is central and single, and the brake calliper 90 and spring are mounted relative to the bar 4 on either side of the latter, substantially within the volume delimited by the bulk of the wheel. The brake calliper 90 makes it possible, on actuation, to engage the brake disk 17 by means of a suitable control, for example hydraulic or electric, said control not per se forming part of the present invention. Of course, this type of brake with a disk is only one design variant and, in more general terms, the invention may use braking means comprising a part of revolution provided with at least one braking track, said part of revolution belonging to said assembly and being integral with the hub, said assembly comprising a braking member for applying a frictional material to said track, said braking member being integral with the wheel carrier, said braking member and said spring being mounted relative to the bar on either side of the latter.

The invention is illustrated with regard to its use for a driving wheel. Consequently, in this particular case, the assembly comprises a gearwheel 18 integral with the hub 15. The gearwheel 18 is in engagement with a pinion 95 mounted rotatably on the wheel carrier 3. This pinion 95 is integral with a transmission shaft, so as to be capable of applying a torque to said hub via the gearwheel 18. In this example, the torque is supplied by a motor integrated into the assembly provided by the invention. This is, here, an electric motor 97, called a traction motor, the stator of which is integral with the wheel carrier 3. Such an electric motor can be operated so as to apply not only a driving torque, but also a braking torque to the hub 15 and therefore to the wheel 14. Alternatively, the transmission could be mechanical, said pinion then comprising means for receiving a mechanical transmission shaft, so as to be capable of applying a torque to said hub via the gearwheel. It is known to produce transmission shafts which adapt to the length variations which the deflection of the wheel and, where appropriate, its steering would bring about.

The invention allows a particularly compact design of the wheel connecting system. In the example described, it can be seen that the electric traction motor is itself accommodated in an overall envelope V delimited radially by the reference diameter $\phi_R$ and axially, from a limit set by the disk of said wheel, by a width less than double the reference width $L_R$. The assembly is highly compact in light of the number of functions which are performed.

A wheel connecting assembly, which is the most elaborate version of the invention, has just been described. This version integrates into the inner volume of a wheel the guidance which ensures the required deflection. It also integrates the spring function and damping function, these being capable of assuming sophisticated forms for the purpose of producing an active suspension. This version integrates a disk brake together with its calliper and, moreover, integrates a motorizing function. It also provides a pivot for allowing wheel steering, and it is suitable for mounting on the body, making it possible to vary the camber.

Figure 5:
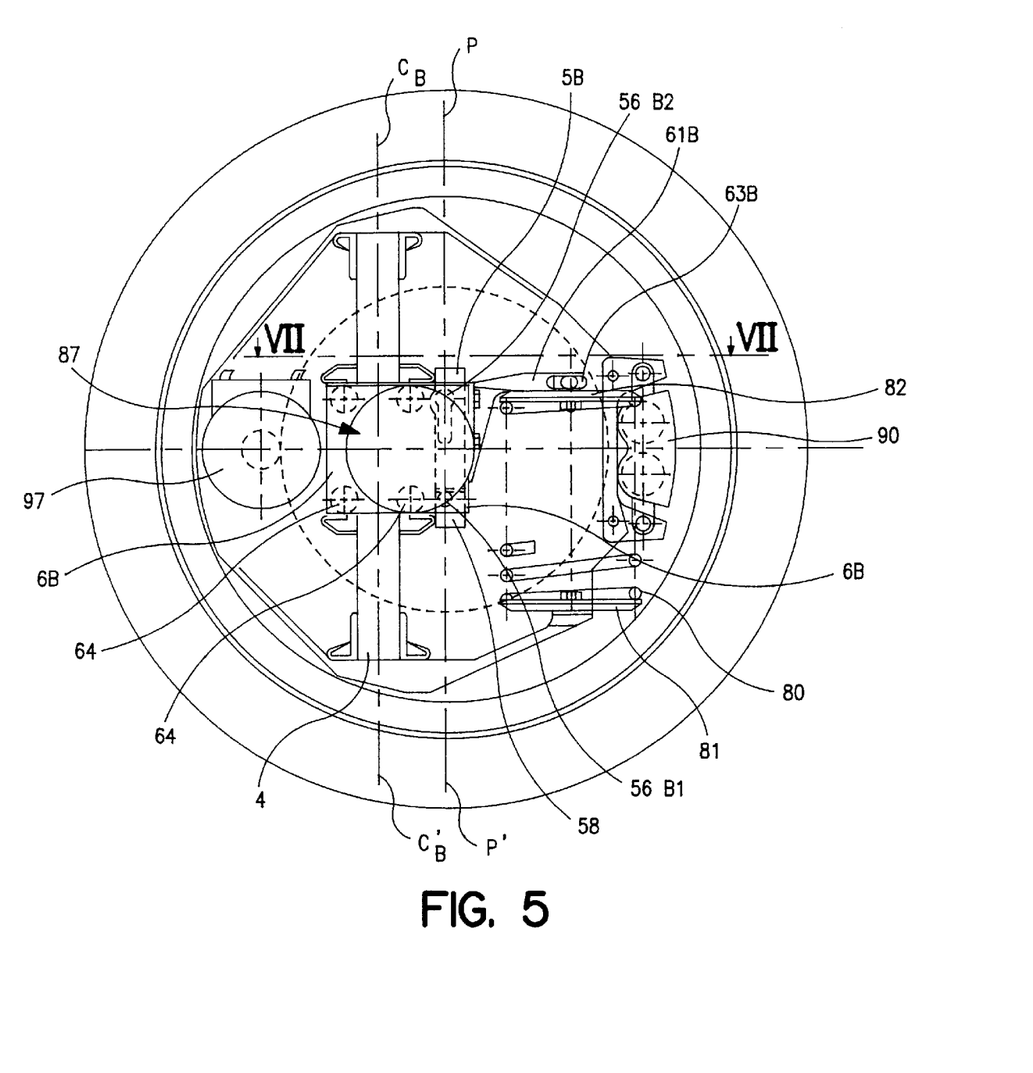
FIG. 5 is a front view with some partial sections in a plane perpendicular to the axis of rotation, illustrating a second embodiment of the invention.
Figure 6:
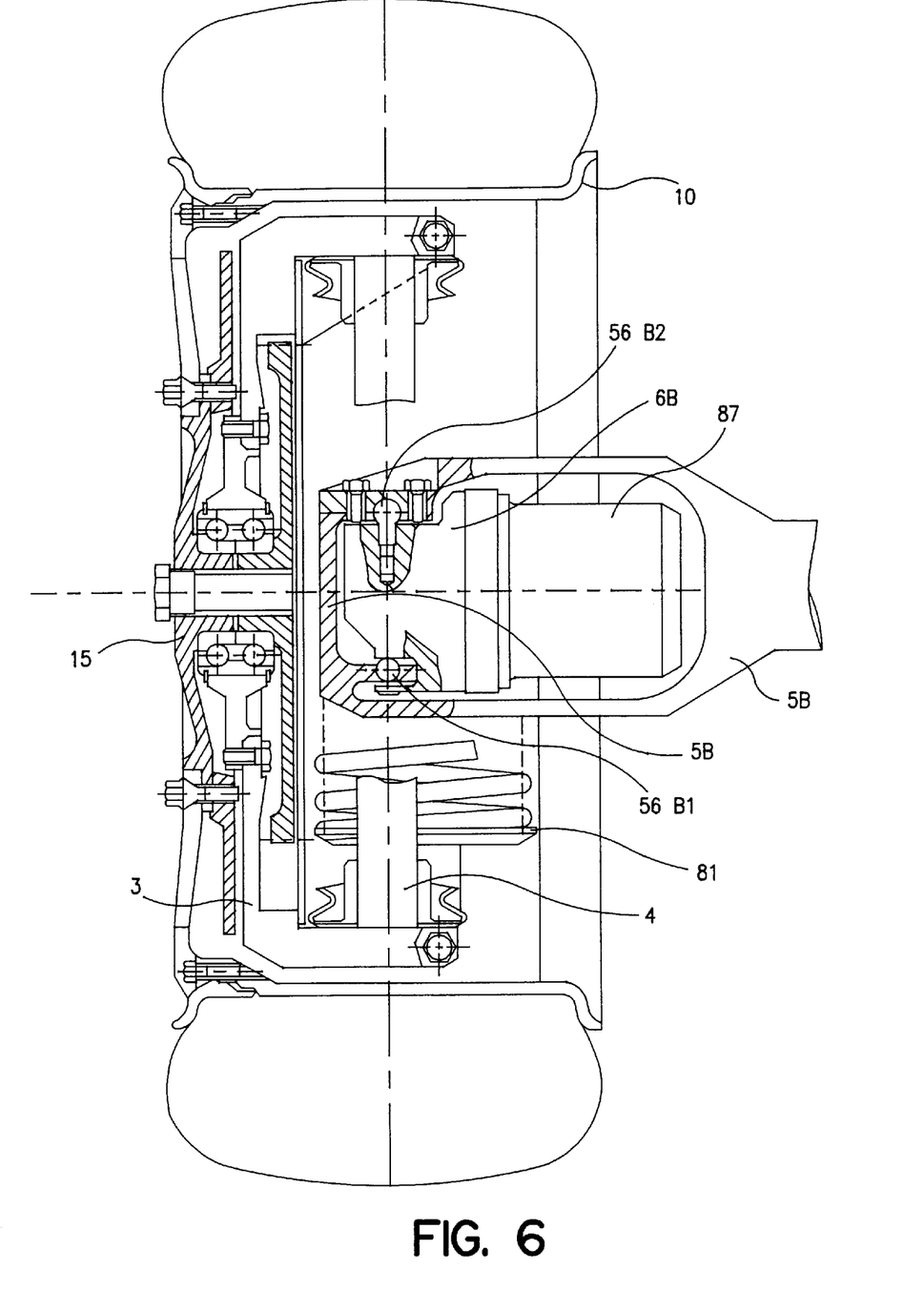
FIG. 6 is a partial view, with the section along $C_B$–$C'_B$ and P–P' of FIG. 5, illustrating the second embodiment of the invention.
Figure 7:
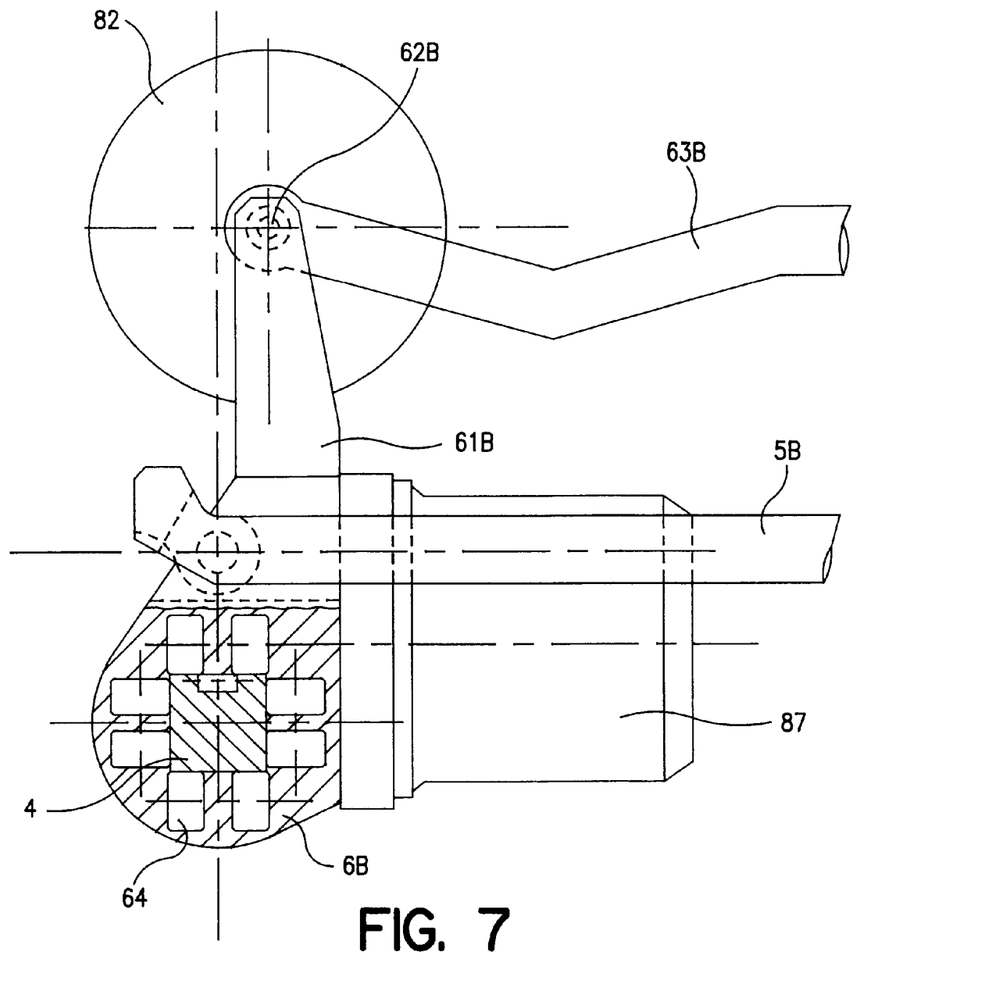
FIG. 7 is a section along VII—VII of FIG. 5.

FIGS. 5, 6 and 7 illustrate an alternative embodiment which affords all the functions described above, except the variation in camber. The drawings and the accompanying description adopt the same references when the members are identical or have only minor differences, and the main differences in design are stressed, these being summarized as follows: the axis of the bar 4 and the axis of rotation of the hub carrier 15 are offset, the pivot axis being defined by pivot points arranged on the guide member laterally relative to the axis of the bar. The result of this is that, here, the pivot axis PP' does not coincide with the sliding axis $C_B C'_B$ of the bar 4. This makes it possible to carry out pivoting by means of ball joints 56B1 and 56B2, instead of using rolling bearings (see the rolling bearing 56 of the first embodiment), while at the same time arranging the members so as to afford sufficient suspension deflection and great compactness.

The support 5B is designed to be mounted directly on the chassis of a vehicle. On the same side as the assembly provided by the invention, said support 5B is connected to the guide member 6B by means of two ball joints 56B1 and 56B2 which define the pivot axis PP'. The support 5B terminates in a fork which can be seen clearly in FIG. 6 and which is closed again at its end, this being conducive to rigidity. The electromechanical machine 87 used for the suspension of the wheel can be seen within the fork. Just as in the preceding example, the pivot axis PP' is secant with the axis XX' of rotation of the wheel and is arranged substantially in the midplane V—V of the wheel. However, here, the guide member 6B guiding the sliding of the bar 4 is clearly offset relative to the ball joints 56B1 and 56B2, as may be seen very clearly in FIGS. 5 and 7. The sliding axis $C_B C'_B$, on the one hand, and the pivot axis PP', on the other hand, are therefore offset. This time, the spring 80 and the brake calliper 90 are both accommodated on the same side of the bar 4.

Beyond that, substantially the same members are found again, in particular the rollers 64 cooperating with raceways arranged on the bar 4 in order to guide the latter. An electric traction motor 97 is likewise found again. The spring 80 is installed between a first collar 81, connected to the wheel carrier 3 in order to be vertically moveable together with the wheel, and a second collar 82 integral with the guide member 6B and therefore vertically immoveable relative to the vehicle body. In this variant too, the spring 80 is mounted between two bearing points (embodied by the collars 80 and 81) which are offset relative to the axis $C_B C'_B$ of the bar 4, this being conducive to compactness. The assembly is accommodated in the same envelope delimited as before.

The bar 4 is accommodated at a location where the available space is scarcely less than the inside diameter $\phi_R$ of the rim 10. The translational movement of the bar 4 in the guide member 6B is sufficient both upwards and downwards. It therefore allows a sufficient suspension stroke in terms of both expansion and compression.

It may also be noted that a lever 61B (FIGS. 5 and 7) is integral with the guide member 6B. The lever 61B terminates at an engagement point 62B to be connected to a steering rod 63B. That collar 82 which is integral with the guide member is likewise mounted on this lever, thus transferring within the wheel the chassis reference in relation to which the wheel will be deflected.

Figure 8:
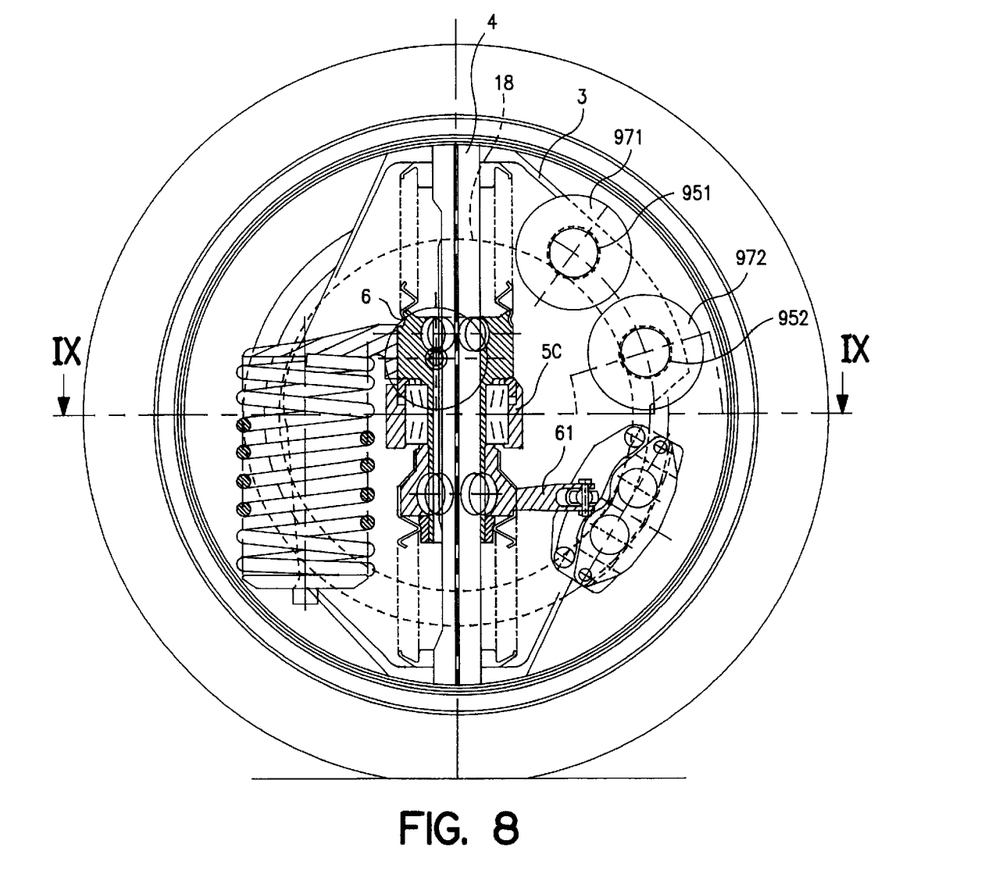
FIG. 8 is a partial view, with a partial section along VIII—VIII of FIG. 9, illustrating a third embodiment of the invention.
Figure 9:
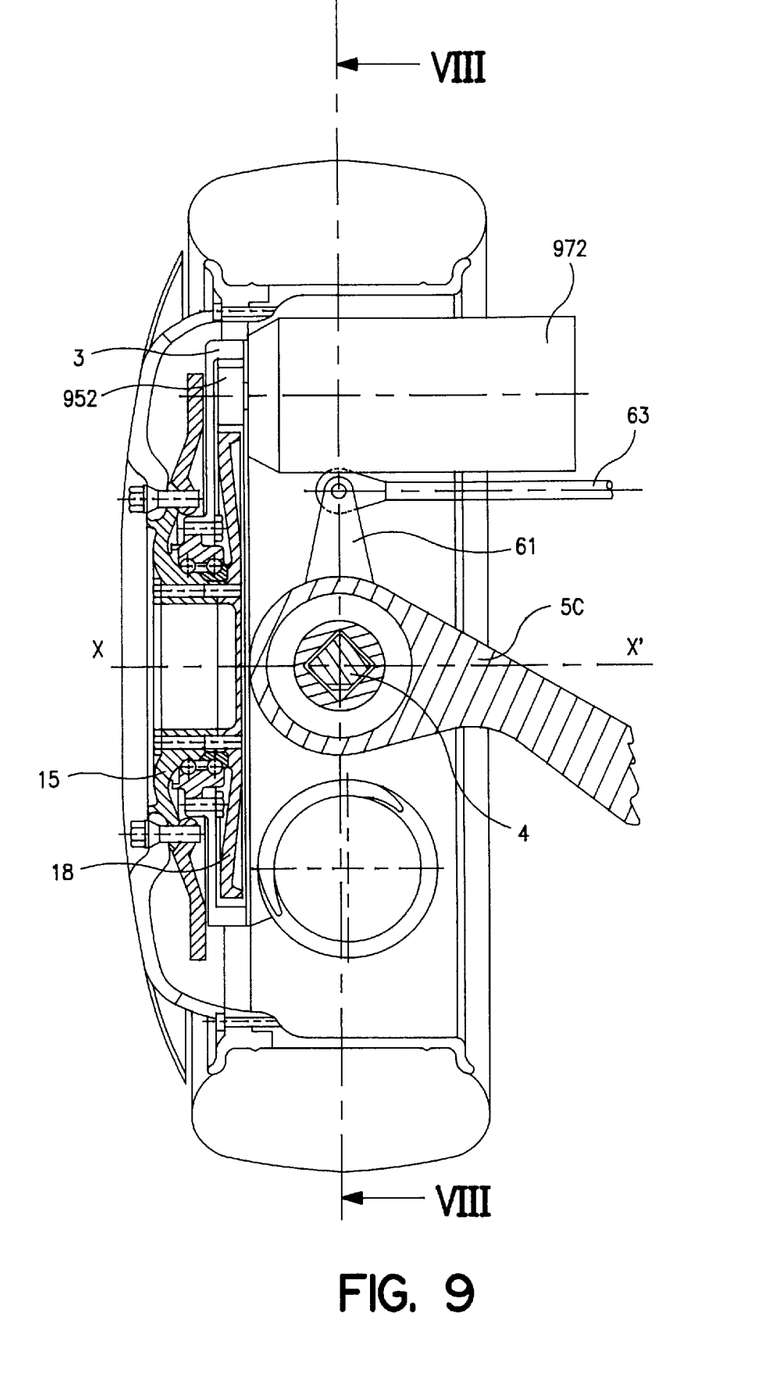
FIG. 9 is a partial view, with a partial section along IX—IX of FIG. 8, illustrating the third embodiment of the invention.

FIGS. 8 and 9 show a third variant which is very close to the first, except that it does not make it possible to vary the camber. The drawings and accompanying description adopt the same references when the members are identical or have only minor differences, and the main differences in design are stressed, these being summarized as follows: the variation which it illustrates deals essentially with traction, that is to say the application of a torque to the hub.

The support 5C is designed to be mounted directly on the chassis of a vehicle. The gearwheel 18 integral with the hub 15 is found again, so as to ensure that a torque is transmitted between the gearwheel 18 and the hub 15. The axis of rotation is the axis XX'. FIG. 8 shows two electric motors 971 and 972, called traction motors, the stators of which are integral with the wheel carrier 3. The rotors of the motors 971 and 972 drive the pinions 951 and 952 which are themselves in engagement on the gearwheel 18. These electric motors 971 and 972 can be operated to apply not only a driving torque, but also a braking torque to the hub 15. It can thus be seen that there is sufficient space for accommodating a plurality of traction motors, whatever the type of motor (for example, electric, hydraulic). Preferably, electric traction motors are used, these being designed for a high maximum rotational speed, thereby reducing the required torque and consequently reducing the volume of the motor, while ensuring that the performances are constant. This type of motor, with a high maximum nominal speed, may, of course, be used alone. A higher torque may also be achieved by using a plurality of motors, each having a small volume. Installing an electric motor, the rotor of which is in direct engagement with the gearwheel 18, thus affording a step-up of the torque supplied by the electric motor, is likewise an arrangement which is expedient per se. All the design arrangements provided contribute to the great compactness of the assembly and make it easier for the latter to be installed on and adapted to the vehicle.

Depending on the vehicle to be equipped, and even depending on the position of the wheel in the vehicle to be equipped, simpler versions may be designed, these also constituting uses of the invention. In particular, of course, the presence of a pivot and of the motorizing function is not required in all cases.

On the basis of what has just been described, the average person skilled in the art may also proceed with adaptations according to his own wishes, without departing from the scope of the present invention. A pneumatic spring may be used instead of a mechanical spring. It is possible to install a conventional hydraulic shock absorber within the bar, since provision can easily be made for the latter, of slender elongate shape, to be hollow and to have a slot making it possible to transfer a bearing point integral with the guide member into the bar. Instead of a conventional hydraulic shock absorber integrated into the bar, it is also conceivable to integrate into it a linear electromechanical machine which is capable of being operated for this purpose and the stator of which is connected to the guide member and the moveable rotor of which is connected to the bar. A hydraulic jack acting on a hydropneumatic or pneumatic unit may also be installed in the assembly according to the invention. Such a jack may be installed within the bar, as stated with regard to a conventional hydraulic shock absorber, or else installation may be carried out elsewhere in said assembly, for example in the same place as the spring.

The invention, which offers a basic element incorporating all the essential functions of the suspension means of a vehicle, makes it possible, of course, to fix said wheel connecting system by means of vibration filtering elements (elastic rubber blocks) which ensure the mounting of the assembly mounting point or points on the chassis. The elements for fastening to the chassis may, if desired, also afford some longitudinal flexibility in the connection of this assembly to the chassis.

The invention affords the advantage of providing a suspension system having pure kinematics, thus making it easier to install it on a vehicle by arranging the sliding axis in the selected attitude, for example so as to impart a predetermined caster angle, and thus making it easier to use said suspension system in combination with other means affording more elaborate functions, such as, for example horizontal suspension (by allowing actual longitudinal deflection of the support mounting points relative to the vehicle body) or, for example, control of the camber.

We claim:

1. A wheel connecting assembly for an automobile, said assembly comprising a hub to support a wheel from a chassis of the automobile, said wheel including a disk defining a wheel plane perpendicular to the axis of rotation of the wheel and passing through the center of the area of contact with the ground of a tire mounted on said wheel, said wheel having a reference width ($L_R$) and a reference diameter ($\phi_R$), said assembly further comprising a wheel carrier defining an axis of rotation of the hub, a support having a guide member for guiding the wheel carrier in translational movement relative to the support, mounting means for mounting the support on the chassis, the wheel carrier being mounted on the guide member by means of a single elongate bar having two ends and sliding relative to and guided by the guide member so as to be fixed against rotation about the sliding axis, the wheel carrier being mounted on the bar at the two ends of the latter, said assembly further comprising means for supporting the automobile load transmitted by the support to the wheel carrier, wherein the wheel carrier, the bar and the guide member are accommodated in a limiting envelope defined radially by the reference diameter ($\phi_R$) and axially, on one side, by a limit set by the disk of said wheel and, on the other side, by a virtual plane tangent to the wheel.

2. The assembly as claimed in claim 1, wherein the means for supporting the load comprise a spring mounted between two bearing points arranged one on the wheel carrier and the other on the support, said bearing points being offset relative to the axis of the bar.

3. The assembly as claimed in claim 2, wherein the spring is accommodated in said limiting envelope.

4. The assembly as claimed in claim 1, comprising linear electromechanical means including a stator and a moveable rotor and in which the stator is connected to the guide member and the moveable rotor is connected to the bar.

5. The assembly as claimed in claim 1, comprising rotary electromechanical means, a rack arranged on the bar and in engagement with a pinion mounted rotatably on the guide member, the rotation of said pinion being controlled by the rotary electromechanical means.

6. The assembly as claimed in claim 4, wherein rollers cooperate with raceways arranged on the bar, said rollers being mounted rotatably on the guide member in order to guide the translational movement of the bar by means of a rolling bearing.

7. The assembly as claimed in claim 1, including means for controlling deflection which means are accommodated in an overall envelope delimited radially by the reference diameter ($\phi_R$) and axially, from a limit set by the disk of said wheel, by a width less than double the reference width ($L_R$).

8. The assembly as claimed in claim 1, including a gearwheel integral with the hub, said gearwheel being in engagement with a pinion mounted rotatably on the wheel carrier, the movement of said pinion being controlled by a traction motor having a stator and a rotor, the stator of which is integral with the wheel carrier and the rotor of which drives said pinion by direct engagement, so as to be capable of applying a torque to said hub via the gearwheel.

9. The assembly as claimed in claim 8, wherein the electric traction motor is accommodated in an overall envelope delimited radially by the reference diameter ($\phi_R$) and axially, from a limit set by the disk of said wheel, by a width less than double the reference width ($L_R$).

10. The assembly as claimed in claim 1, including a gearwheel integral with the hub, a pinion mounted rotatably on the wheel carrier and in engagement with the gearwheel, said pinion comprising means for receiving a mechanical transmission shaft, so as to be capable of applying a torque to said hub via the gearwheel.

11. The assembly as claimed in claim 1, wherein the guide member and the support form a pivot which allows a degree of freedom of rotation of the wheel carrier relative to the support, and wherein the guide member comprises a lever arm, the end of which receives a steering control link.

12. The assembly as claimed in claim 11, wherein the guide member surrounds the bar, and wherein the axis of the bar and the axis of rotation of the hub carrier are secant, the pivot axis coinciding with the axis of the bar, so that said bar is mounted slideably in said pivot.

13. The assembly as claimed in claim 11, wherein the guide member surrounds the bar, and wherein the axis of the bar and the axis of rotation of the hub carrier are offset, the pivot axis being defined by pivot points arranged on the guide member laterally relative to the axis of the bar.

14. The assembly as claimed in claim 2, wherein a lever integral with the guide member terminates at an engagement point connected to a steering rod, one of the two bearing points of the spring likewise being mounted on said lever.

15. The assembly as claimed in claim 1, including braking means supported by the hub, the braking means comprising a part of revolution provided with at least one braking track, said part of revolution belonging to said assembly and being integral with the hub, said assembly comprising a braking member for applying a frictional material to said track, said braking member being integral with the wheel carrier.

16. The assembly as claimed in claim 1, including a support mounting point or points which define, on the support, an axis (AA') and a control point distant from said axis, the axis and the control point receiving means of connection to the chassis which are arranged so as to act on the camber of the wheel.

17. A wheel connecting assembly according to claim 16, in which the support is fastened to the automobile chassis by means of an arm and a rod, the arm being mounted on the chassis of the automobile so as to be capable of transmitting the weight of the latter and transferring said weight to the support at mounting points defining said axis (AA'), the camber of the wheel being controlled through a degree of freedom of tilting of the support about the axis (AA') by said rod.

18. A wheel connecting assembly for an automobile, said assembly comprising a rotating hub designed to support a wheel, said wheel comprising a disk defining a wheel plane perpendicular to an axis of rotation of the hub and passing through the center of the footprint of a tire mounted on said wheel, said assembly comprising:

a suspended support comprising mounting means designed to connect the support to the chassis of the automobile;

a wheel carrier;

a suspended guide member received on the support, the guide member and the support forming a pivot that allows a degree of freedom of steering of the wheel carrier relative to the support;

a non-suspended single elongate bar sliding along an axis relative to and guided by the guide member so as to be non steerable with respect to the guide member about the sliding axis and to provide a suspension movement between the support and the wheel carrier along the sliding axis, said bar being received within the guide member;

said wheel carrier being mounted on the bar at the two ends of the bar, the wheel carrier defining the axis of rotation of the hub; and spring means for supporting the automobile load transmitted by the support to the wheel carrier, said spring means acting between two bearing points, one of which is integral with the wheel carrier and the other of which is integral with the guiding member.

19. The assembly as claimed in claim 18, comprising linear electromechanical means including a stator and a moveable rotor and in which the stator is connected to the guide member and the moveable rotor is connected to the bar.

20. The assembly as claimed in claim 18, comprising rotary electromechanical means, a rack arranged on the bar and in engagement with a pinion mounted rotatably on the guide member, the rotation of said pinion being controlled by the rotary electromechanical means.

21. The assembly as claimed in claim 19, wherein rollers cooperate with raceways arranged on the bar, said rollers being mounted rotatably on the guide member in order to guide the translational movement of the bar by means of a rolling bearing.

22. The assembly as claimed in claim 18, including a gearwheel integral with the hub, said gearwheel being in engagement with a pinion mounted rotatably on the wheel carrier, the movement of said pinion being controlled by a traction motor having a stator and a rotor, the stator of which is integral with the wheel carrier and the rotor of which drives said pinion by direct engagement, so as to be capable of applying a torque to said hub via the gearwheel.

23. The assembly as claimed in claim 18, including a gearwheel integral with the hub, a pinion mounted rotatably on the wheel carrier and in engagement with the gearwheel, said pinion comprising means for receiving a mechanical transmission shaft, so as to be capable of applying a torque to said hub via the gearwheel.

24. The assembly as claimed in claim 18, wherein the guide member comprises a lever arm, the end of which receives a steering control link.

25. The assembly as claimed in claim 24, wherein the guide member surrounds the bar, and wherein the axis of the bar and the axis of rotation of the hub carrier are secant, the pivot axis coinciding with the axis of the bar, so that said bar is mounted slidably in said pivot.

26. The assembly as claimed in claim 24, wherein the guide member surrounds the bar, and wherein the axis of the bar and the axis of rotation of the hub carrier are offset, the pivot axis being defined by pivot points arranged on the guide member laterally relative to the axis of the bar.

27. The assembly as claimed in claim 18, wherein a lever integral with the guide member terminates at an engagement point connected to a steering rod, one of the two bearing points of the spring likewise being mounted on said lever.

28. The assembly as claimed in claim 18, including braking means supported by the hub, the braking means comprising a part of revolution provided with at least one braking track, said part of revolution belonging to said assembly and being integral with the hub, said assembly comprising a braking member for applying a frictional material to said track, said braking member being integral with the wheel carrier.

29. The assembly as claimed in claim 18, including a support mounting point or points which define, on the support, an axis (AA') and a control point distant from said axis, the axis and the control point receiving means of connection to the chassis which are arranged so as to act on the camber of the wheel.

30. A wheel connecting assembly according to claim 29, in which the support is fastened to the automobile chassis by means of an arm and a rod, the arm being mounted on the automobile body so as to be capable of transmitting the weight of the latter and transferring said weight to the support at the mounting points defining said axis (AA'), the camber of the wheel being controlled through a degree of freedom of tilting of the support about the axis (AA') by said rod.

31. A wheel connecting assembly for an automobile, said assembly comprising a rotating hub designed to support a wheel, said wheel comprising a disk defining a wheel plane perpendicular to an axis of rotation of the hub and passing through the center of the footprint of a tire mounted on said wheel, said assembly comprising:

a suspended support comprising mounting means designed to connect the support to the chassis of the automobile;

a suspended guide member received on the support;

a wheel carrier;

a non-suspended single elongate bar sliding relative to and guided by a guide member so as to provide a suspension movement between the support and the wheel carrier along the sliding axis, said bar being received within the guide member;

said wheel carrier being mounted on the bar at the two ends of the bar, the wheel carrier defining the axis of rotation of the hub; and spring means for supporting the automobile load transmitted by the support to the wheel carrier, said spring means acting between two bearing points, one of which is integral with the wheel carrier and the other of which is integral with the guiding member, said bearing points being offset relative to the axis of the bar.

32. The assembly as claimed in claim 31, comprising linear electromechanical means including a stator and a moveable rotor and in which the stator is connected to the guide member and the moveable rotor is connected to the bar.

33. The assembly as claimed in claim 31, comprising rotary electromechanical means, a rack arranged on the bar and in engagement with a pinion mounted rotatably on the guide member, the rotation of said pinion being controlled by the rotary electromechanical means.

34. The assembly as claimed in claim 32, wherein rollers cooperate with raceways arranged on the bar, said rollers being mounted rotatably on the guide member in order to guide the translational movement of the bar by means of a rolling bearing.

35. The assembly as claimed in claim 31, including a gearwheel integral with the hub, said gearwheel being in engagement with a pinion mounted rotatably on the wheel carrier, the movement of said pinion being controlled by a traction motor having a stator and a rotor, the stator of which is integral with the wheel carrier and the rotor of which drives said pinion by direct engagement, so as to be capable of applying a torque to said hub via the gearwheel.

36. The assembly as claimed in claim 31, including a gearwheel integral with the hub, a pinion mounted rotatably on the wheel carrier and in engagement with the gearwheel, said pinion comprising means for receiving a mechanical transmission shaft, so as to be capable of applying a torque to said hub via the gearwheel.

37. The assembly as claimed in claim 31, wherein the guide member and the support form a pivot which allows a degree of freedom of rotation of the wheel carrier relative to the support, and wherein the guide member comprises a lever arm, the end of which receives a steering control link.

38. The assembly as claimed in claim 37, wherein the guide member surrounds the bar, and wherein the axis of the bar and the axis of rotation of the hub carrier are secant, the pivot axis coinciding with the axis of the bar, so that said bar is mounted slidably in said pivot.

39. The assembly as claimed in claim 37, wherein the guide member surrounds the bar, and wherein the axis of the bar and the axis of rotation of the hub carrier are offset, the pivot axis being defined by pivot points arranged on the guide member laterally relative to the axis of the bar.

40. The assembly as claimed in claim 31, wherein a lever integral with the guide member terminates at an engagement point connected to a steering rod, one of the two bearing points of the spring likewise being mounted on said lever.

41. The assembly as claimed in claim 31, including braking means supported by the hub, the braking means comprising a part of revolution provided with at least one braking track, said part of revolution belonging to said assembly and being integral with the hub, said assembly comprising a braking member for applying a frictional material to said track, said braking member being integral with the wheel carrier.

42. The assembly as claimed in claim 31, including a support mounting point or points which define, on the support, an axis (AA') and a control point distant from said axis, the axis and the control point receiving means of connection to the chassis which are arranged so as to act on the camber of the wheel.

43. A wheel connecting assembly according to claim 42, in which the support is fastened to the vehicle body by means of an arm and a rod, the arm being mounted on the vehicle body so as to be capable of transmitting the weight of the latter and transferring said weight to the support at the mounting points defining said axis (AA'), the camber of the wheel being controlled through a degree of freedom of tilting of the support about the axis (AA') by said rod.

* * * * *